United States Patent [19]

Wade et al.

[11] Patent Number: 5,564,353

[45] Date of Patent: Oct. 15, 1996

[54] METHOD FOR FORMING A PLANTING HOLE IN SOIL WHILE LEAVING A SUBSTANTIAL PORTION OF PULVERIZED SOIL IN THE HOLE

[75] Inventors: Richard R. Wade, Orient, Ohio; Joseph L. Williams, Owenton; Todd A. Sheets, Williamstown, both of Ky.

[73] Assignee: Ernie Green Industries, Inc., Williamstown, Ky.

[21] Appl. No.: 337,549

[22] Filed: Nov. 10, 1994

[51] Int. Cl.$^6$ .................................................. A01C 11/00
[52] U.S. Cl. ...................... 111/116; 111/115; 172/111; 172/22; 175/323; 175/394
[58] Field of Search .......................... 111/115, 116, 117; 172/21, 22, 23, 41, 25, 110, 111, 125, 522; 408/230; 175/323, 394, 19

[56] References Cited

U.S. PATENT DOCUMENTS

| | | | |
|---|---|---|---|
| 88,891 | 4/1869 | McMahen | 175/394 |
| 143,276 | 9/1873 | Cooley | 175/394 |
| 404,741 | 6/1889 | Stoltze, Sr. | 175/394 |
| 455,824 | 7/1891 | Wyman | 175/394 |
| 469,427 | 2/1892 | Tyler | 175/394 |
| 515,731 | 2/1894 | Daugherty et al. | 175/394 |
| 553,660 | 1/1896 | Pederson | 175/394 |
| 1,176,992 | 3/1916 | Sholl | 175/394 |
| 1,637,098 | 7/1927 | Barnes . | |
| 1,697,665 | 1/1929 | Shields . | |
| 2,320,612 | 6/1943 | Kandle | 175/394 |
| 2,591,233 | 4/1952 | Browne | 175/394 |
| 2,779,259 | 1/1957 | Kelsey . | |
| 2,864,633 | 12/1958 | Mackie . | |
| 2,991,838 | 7/1961 | Lane . | |
| 3,129,771 | 4/1964 | Lidstone . | |
| 3,282,055 | 11/1966 | Landau | 175/19 |
| 3,333,825 | 8/1967 | Wolter et al. . | |
| 3,356,168 | 12/1967 | Johnson . | |
| 3,382,937 | 5/1968 | Watts | 175/323 |
| 3,387,674 | 6/1968 | Watson | 175/394 |
| 3,425,087 | 2/1969 | Fitzhugh . | |
| 3,533,715 | 10/1970 | Gross . | |
| 3,896,890 | 7/1975 | Gale | 175/19 |
| 3,961,671 | 6/1976 | Adams et al. | 175/19 X |
| 4,003,436 | 1/1977 | Foster et al. . | |
| 4,323,019 | 4/1982 | Haddock . | |
| 4,672,901 | 6/1987 | Stine | 111/116 |
| 4,807,710 | 2/1989 | Greeley | 175/394 |
| 4,901,800 | 2/1990 | Wilson | 111/116 X |
| 4,981,000 | 1/1991 | Hamilton et al. | 175/394 X |
| 4,986,368 | 1/1991 | Underwood et al. | 175/394 |
| 5,067,571 | 11/1991 | Niewold et al. . | |
| 5,113,952 | 5/1992 | Niewold et al. . | |
| 5,133,269 | 7/1992 | Charneski . | |

FOREIGN PATENT DOCUMENTS 825476 12/1951 Germany .

Primary Examiner—Terry Lee Melius
Assistant Examiner—Victor Batson
Attorney, Agent, or Firm—Killworth, Gottman, Hagan & Schaeff

[57] ABSTRACT

A planting hole forming apparatus includes a central shaft having a longitudinal axis, a bottom leading end and an upper trailing end, and a discontinuous flighting comprising a plurality of flighting sections spiraling around the central shaft at spaced locations along the shaft adjacent the bottom leading end. Some form of drive mechanism, for example a hand-held drill, is used to rotate the central shaft about its longitudinal axis to thereby form the planting hole. The drive mechanism is chosen to accommodate the size of the central shaft and to supply the necessary torque to rotate the central shaft sufficiently to form the planting hole. The structure of the flighting sections is such that while the planting hole is being formed the soil is simultaneously pulverized with a substantial portion of the pulverized soil being left in the hole.

3 Claims, 2 Drawing Sheets

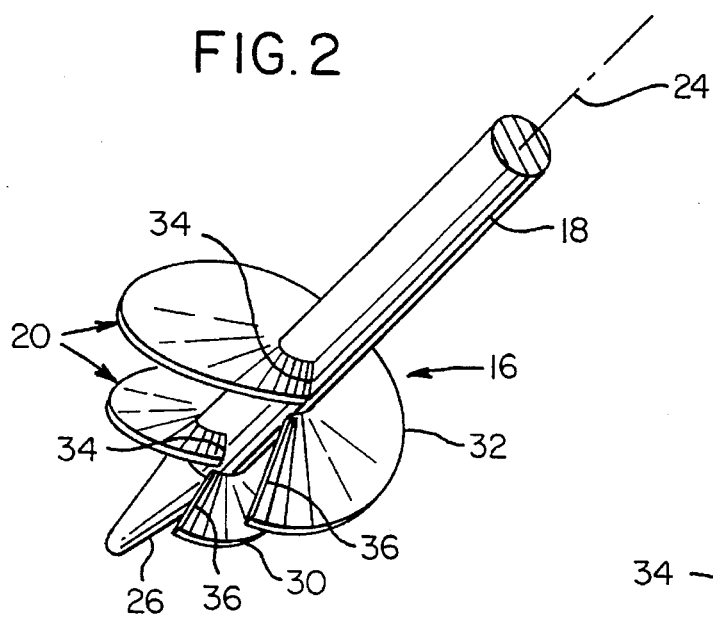
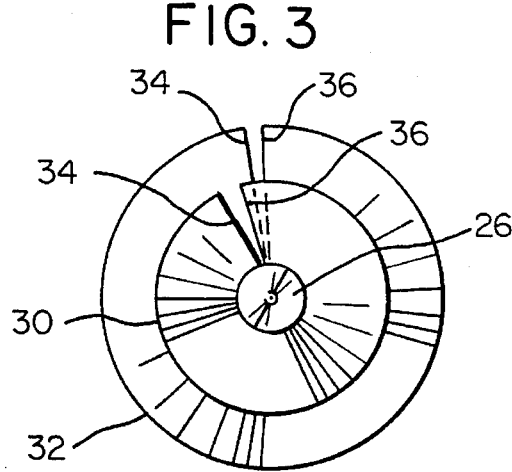
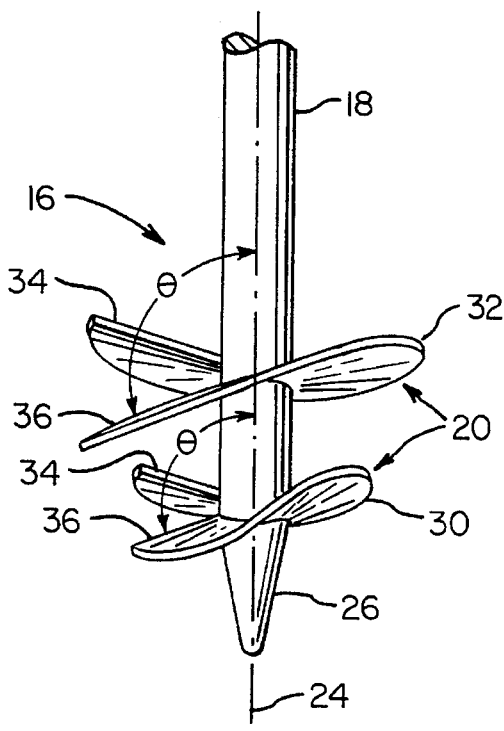
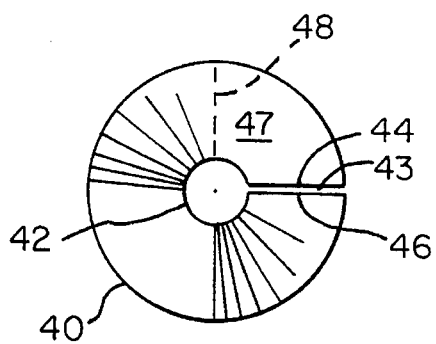

5,564,353

METHOD FOR FORMING A PLANTING HOLE IN SOIL WHILE LEAVING A SUBSTANTIAL PORTION OF PULVERIZED SOIL IN THE HOLE

FIELD OF THE INVENTION

The present invention is generally related to gardening and landscaping apparatus for forming holes in the ground to receive plants or seeds, and more particularly to an auger-type apparatus for forming a planting hole in the ground, and even more particularly to an auger-type bit that pulverizes the soil as it bores a hole in the ground and at the same time leaves a substantial portion of the pulverized soil in the hole.

BACKGROUND OF THE INVENTION

In planting most forms of vegetation such as trees, bushes, flowers, ground cover, bulbs, seeds and the like, the best results are obtained by surrounding the plant roots or the seed with loosely packed soil to promote root growth. If the surrounding soil is too hard packed, the plant can become root bound. However, the soil is often hard packed at locations where planting is desirable. One solution to this problem has been to form an oversized hole, pulverize the hard packed soil removed to make the hole and loosely pack the pulverized soil around the roots or the seed during the planting process. It is especially important for there to be a thick layer of pulverized soil underneath the plant, when a deep root system is desired.

Before the development of powered garden tools and landscaping equipment, such vegetation was planted by hand, typically using a shovel or the like to dig out a suitably sized hole in the ground to accommodate the plant or seed and the pulverized soil. Pulverizing soil by hand is very laborious and time consuming. With today's powered gardening tools and landscaping equipment, forming an oversized hole and producing sufficiently pulverized soil has become significantly less labor intensive and time consuming. However, even with present power tools and equipment, there is still a need to reduce the manual labor and time associated with the planting process.

One prior hole forming device, as disclosed in U.S. Pat. No.5,113,952, includes an auger bit with a single continuous flighting for use with a hand-held power tool such as a drill. The auger bit disclosed in the '952 patent bores a hole in the ground for planting flower bulbs and the like, pulverizing the soil in the process. A substantial amount of the pulverized soil is removed from the hole by the action of the continuous flighting. Since it is desirable for a thick layer of pulverized soil to surround the plant roots or seed, especially when the surrounding soil is hard packed, a substantial portion of the removed pulverized soil must be put back in the hole. This refilling step is labor intensive and adds to the time needed to perform the planting operation. Therefore, there is a need for a planting apparatus that pulverizes the soil as it forms a planting hole in the ground and at the same time is capable of leaving a substantial portion of the pulverized soil in the hole.

U.S. Pat. No. 4,323,019 discloses an apparatus for planting tree seedlings or the like which pulverizes the soil as it bores a hole in the ground and includes a tubular support stand for keeping virtually all of the pulverized soil in the planting hole as it is being formed. However, this device is disclosed as being limited to planting tree seedlings and the like. In addition, this apparatus is relatively expensive to manufacture because of its complex structure. Therefore, there is also a need for a more versatile yet inexpensive alternative to the apparatus disclosed in the '019 patent.

SUMMARY OF THE INVENTION

Accordingly, one objective of the present invention is to provide an apparatus for forming a planting hole in soil capable of pulverizing the soil while the planting hole is being formed and at the same time leaving a substantial portion of the pulverized soil in the hole.

An additional objective of the present invention is to provide such a planting hole forming apparatus that is versatile yet inexpensive to manufacture.

Another objective of the present invention is to provide such a planting hole forming apparatus that facilitates planting by reducing the time and labor required for planting.

Still another objective of the present invention is to provide such a planting hole forming apparatus capable of forming deep holes substantially filled with a thick layer of loosely packed pulverized soil to promote deep root growth.

Yet another objective of the present invention is to provide such a planting hole forming apparatus capable of forming suitable holes for planting a wide variety of plant-life, including seeds.

A further objective of the present invention is to provide such a planting hole forming apparatus that is hand-held and portable.

The above and other objectives of the present invention are obtained by providing a planting hole forming apparatus which includes a central shaft having a longitudinal axis, a bottom leading end and an upper trailing end, and a discontinuous flighting comprising a plurality of flighting sections spiraling around the central shaft at spaced locations along the shaft adjacent the bottom leading end. Some form of drill mechanism is used to rotate the central shaft about its longitudinal axis to thereby form the planting hole. The drill mechanism is chosen to accommodate the size of the central shaft and to supply the necessary torque to rotate the central shaft sufficiently to form the planting hole. The structure of the flighting sections is such that while the planting hole is being formed the soil is simultaneously pulverized with a substantial portion of the pulverized soil being left in the hole.

In one embodiment of the present invention, the central shaft with its discontinuous flighting is in the form of an auger-type bit with the upper trailing end of the central shaft being mountable to and removable from a drill mechanism, for example, a conventional hand-held drill or a backhoe with a drilling boom. One feature of the present invention is to provide different sizes of such auger-type bits that are interchangeable and may be used with the same drill mechanism. In this way, different diameter holes can be readily formed to accommodate the needs of different plants and seeds. In addition, the length of the central shaft can be varied to enable holes of different depths to be formed and thereby promote a desired degree of deep-root growth.

In another embodiment of the present invention, the plurality of flighting sections includes a lower flighting section closer to the bottom leading end and an upper flighting section spaced thereabove along the central shaft. One feature of this embodiment is that the upper flighting section spirals around the central shaft substantially only about once. It may be desirable for both the upper and lower flighting sections to each spiral around the central shaft substantially only about once. Another feature of this embodiment is for the upper flighting section to have an effectively larger outside diameter than that of the lower flighting section. That is, the upper flighting section extends radially out from the central shaft a perpendicular distance from the shaft greater than that of the lower flighting section.

In a general feature of the present invention, each of the flighting sections changes slope at least once while spiraling around and along the central shaft. With each of the flighting sections having opposite ends, satisfactory results have been obtained with one of its opposite ends sloping toward and the other end sloping away from the bottom leading end of the central shaft. Satisfactory results have also been obtained with each of the flighting sections extending radially out at an acute angle from the longitudinal axis of the central shaft and spiraling around the central shaft.

Because of its structure, the present invention is able to prevent a substantial amount of the soil pulverized during the formation of the planting hole from being thrown outside of the hole. With the soil pulverized, seeds, flower bulbs and the like may simply be inserted into the pulverized soil to a desired depth. If desired, it is also possible for the present invention to mound an upper layer of the pulverized soil outside of the planting hole in order to form a shallow cavity in the hole for receiving balled trees or bushes, potted plants, the like. The small mound of pulverized soil is then used to fill-in around and/or cover over the roots. In either case, a substantial amount of the pulverized soil remains underneath the plant or seed to facilitate deep root growth. In the past, the pulverized soil was either substantially removed to form the hole and then replaced, or the hole forming and soil pulverizing process was accomplished employing a relatively complex and costly device.

The above and other objectives, features, and advantages of the present invention will become apparent upon consideration of the detailed description and the appended drawings.

BRIEF DESCRIPTION OF THE DRAWINGS

FIG. 2 is an enlarged perspective view of the circled area 2 showing the bottom leading end of the auger-type bit of FIG. 1;

FIG. 3 is a bottom plan view of the bottom leading end of the auger- type bit of FIG. 2;

FIG. 4 is a side plan view of the auger-type bit of FIG. 2; and

FIG. 5 is a plan view of a C-shaped disk used in making a flighting section of an exemplary auger-type bit.

DETAILED DESCRIPTION OF THE INVENTION

Figure 1:
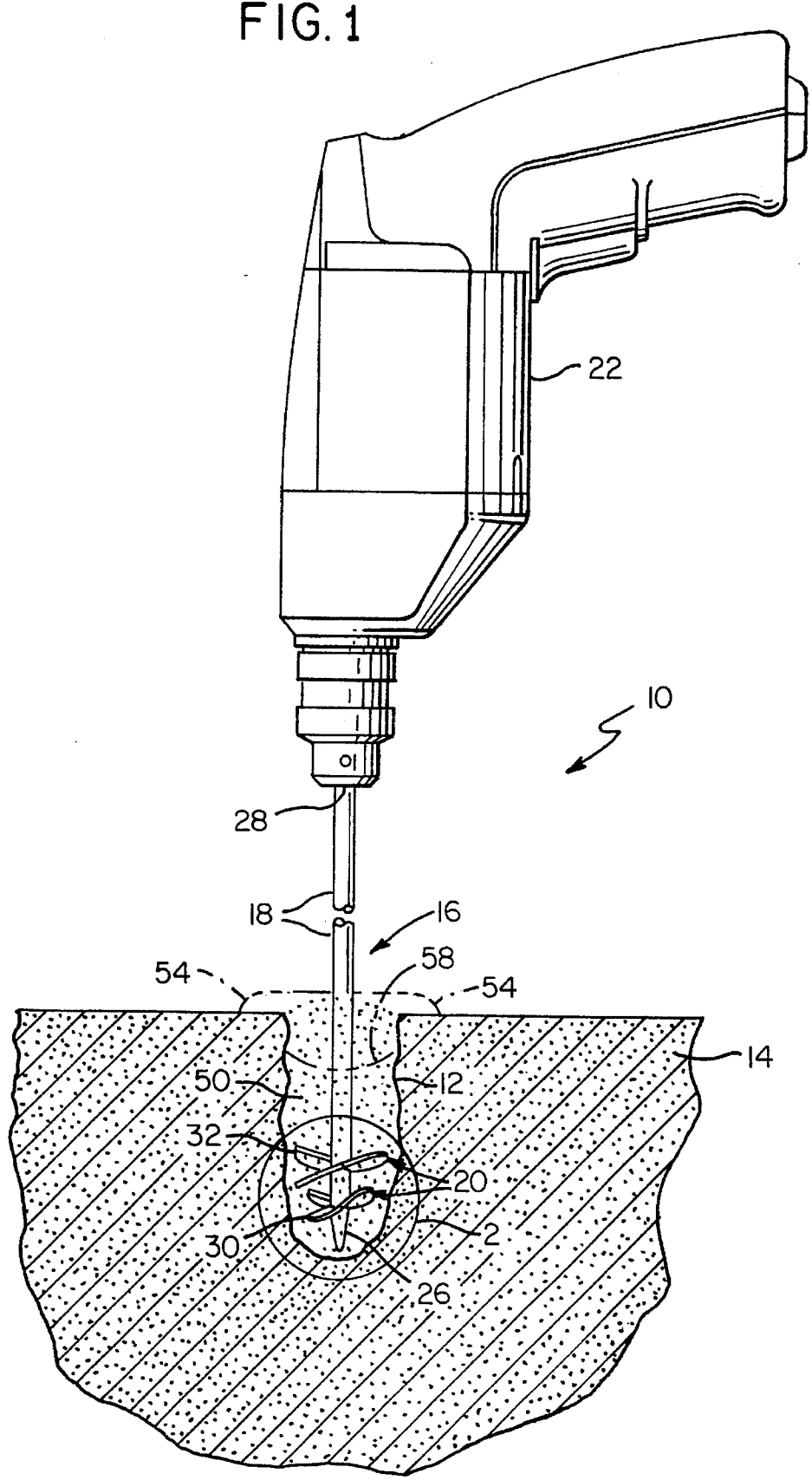
FIG. 1 is a partially sectioned side view of an auger-type bit according to the present invention, with its bottom leading end embedded in soil and its upper trailing end mounted in a hand-held drill.

Although the present invention is herein described in terms of a specific embodiment, it will be readily apparent to those skilled in this art that various modifications, rearrangements, and substitutions, only some of which are described herein, can be made with out departing from the spirit of the invention. The scope of the present invention is thus only limited by the claims appended hereto.

Referring to FIGS. 1 and 2, one embodiment of an apparatus 10 incorporating the principles of the present invention is shown forming a planting hole 12 in soil 14. The exemplary apparatus 10 includes an auger-type bit 16 comprising a central shaft 18 with a discontinuous flighting 20, and a drill mechanism, for example, hand-held drill 22. The central shaft 18 has a longitudinal axis 24, a bottom leading end 26 and an upper trailing end 28. The tip of the bottom leading end 26 of shaft 18 is preferably pointed to aid the auger-type bit 16 in penetrating soil 14 to form planting hole 12.

The discontinuous flighting 20 includes, in this embodiment, a lower flighting section 30 and an upper flighting section 32. The flighting sections 30 and 32 spiral around the central shaft 18 at spaced locations along the central shaft 18 adjacent the bottom leading end 26. The lower flighting section 30 is disposed closer to the bottom leading end 26 and the upper flighting section 32 is disposed at a spaced location thereabove along the central shaft 18.

The upper trailing end 28 of the central shaft 18 is mountable to and removable from the drill 22 by conventional means well known in the art, which form no part of the present invention and thus will not be further discussed herein. The drill 22 is operatively adapted for rotating the central shaft 18 about its longitudinal axis 24 and thereby causing the auger-type bit 16 to bore into the soil 14 and form planting hole 12.

Referring to FIGS. 3 and 4, at least the upper flighting section 32, and for this exemplary embodiment the lower flighting section 30, spirals around the central shaft 18 substantially only about once. Though not necessarily critical to the successful operation of the present invention, successful results have been obtained when the upper flighting section 32 of exemplary bit 16 has an effectively larger outside diameter than that of the lower flighting section 30. That is, the upper flighting section 32 extends radially out from the central shaft 18 a perpendicular distance greater than that of the lower flighting section 30 (see FIG. 3). Each of the flighting sections 30 and 32 changes slope at least once while spiraling around and along the central shaft 18. Each flighting section 30 and 32 has opposite ends 34 and 36, with end 36 sloping toward and end 34 sloping away from the bottom leading end 26 of the central shaft 18.

An auger-type bit 16 was manufactured by making each of the flighting sections 30 and 32 out of a generally C-shaped disk 40 having a central hole 42 and a radial split 43 extending out from the hole 42 to form its general C-shape (See FIG. 5). Each radial split 43 is formed by two opposite free edges 44 and 46, which respectively correspond to the opposite ends 34 and 36 of each flighting section 30 and 32. A larger diameter disk 40 was used to form the upper flighting section 32 and a smaller diameter disk 40 was used to form the lower flighting section 30. The central shaft 18 was disposed through the central hole 42 of each generally C-shaped disk 40 and fixed thereto such as by welding.

Initially, each disk 40 was generally flat and positioned on the central shaft 18 at an obtuse angle θ to the shaft axis 24, with each radial split 43 sloping down toward the bottom leading end 26. Thus, the ends 34 and 36 of each flighting section 30 and 32 started out sloping in the same direction down toward the bottom leading end 26. A portion 47 of each disk 40 was then bent, generally along phantom line 48, to gradually slope upward toward the trailing end 28 of shaft 18. Each bent portion 47 formed about a quarter of the surface area of its disk 40 and corresponds to the end 34 of each flighting section 30 and 32. Each portion 47 is then welded in place to thereby form the flighting sections 30 and 32. The flighting sections 30 and 32 are generally kept parallel to one another when fixed to shaft 18.

The central shaft 18 of one exemplary auger bit 16 manufactured in the above manner has a diameter of about 0.5 inches. The lower and upper flighting sections 30 and 32 have an outside diameter of about 1.8 inches and about 2.5 inches, respectively. The lower flighting section 30 is fixed about 1 inch from the tip of the bottom leading end 26, and the upper flighting section 32 is spaced about 0.85 inches behind flighting section 30 along shaft 18.

In operation, the present apparatus 10 is useful for turning even hard packed soil 14 into pulverized soil 50 while forming the planting hole 12. The use of the discontinuous flighting 20 on shaft 18 enables a planting hole 12 to be formed and soil 14 pulverized while at the same time leaving a substantial portion of the pulverized soil 50 in the hole 12. To form a planting hole 12 which is substantially filled with pulverized soil 50 (i.e., little if any soil 50 is thrown out of the hole 12), the bottom leading end 26 of shaft 18 is initially embedded into soil 14. For the right handed flighting 20 shown, the shaft 18 is then rotated clockwise by drill 22 and simultaneously forced axially downward into soil 14.

Shaft 18 is initially rotated at a relatively slow rate until the flighting sections 30 and 32 are embedded into soil 14. As flighting sections 30 and 32 proceed deeper and deeper into soil 14, drill 22 can be actuated to increase the rotation of shaft 18 to faster and faster RPM's (revolutions per minute) without pulverized soil 50 being thrown out of the hole 12. The downward progression of the auger-type bit 16 into soil 14 is then continued until the desired depth of planting hole 12 is reached.

The extraction of the bit 16 without the removal of a substantial portion of the pulverized soil 50 from hole 12 is preferably accomplished by reversing the rotation of shaft 18 while pulling shaft 18 out of the now fully formed planting hole 12. Removal of the shaft 18 from hole 12 may also be accomplished when the shaft 18 is rotated clockwise but with a greater amount of soil 50 being thrown out.

Soil 50 in the hole 12 may be pulverized to varying degrees of consistency (i.e., loose packing) by moving bit 16 up and down in the hole 12 while the drill 22 continues to rotate the shaft 18. The speed at which the auger-type bit 16 is removed from hole 12 will also have an effect on how much if any of the pulverized soil 50 is thrown out of the planting hole 12. With the soil 50 pulverized in this manner and left substantially in the hole 12, a seed, bulb or the like may be planted by simply being inserted into the now loosely packed soil 50 to a desired depth without any need for refilling hole 12.

For planting balled trees or bushes, potted plants and the like (not shown), limited mounding of the pulverized soil 50 (as shown in phantom and designated 54) may be desirable in order to form a shallow cavity (shown in phantom and designated 58) for receiving the balled tree or bush, potted plant or the like. If necessary, pulverized soil 50 from mound 54 may then be used to fill-in around and/or over the roots of the balled tree or bush, potted plant or the like. Even with such a filling step, planting with the present invention is not as labor intensive and takes less time to accomplish because a substantial amount of the pulverized soil 50 still remains in the hole 12.

It is often desirable for a plant to be firmly rooted into the soil 14, especially in the case of trees and bushes which are prone to being toppled over by high winds if not securely rooted in place. It is also typically desirable for plants used as ground cover to be firmly rooted into the ground in order to inhibit soil erosion due to water runoff from heavy rains. The present invention helps plants become firmly rooted, quickly, even in hard packed soil 14 by providing a bed of loosely packed pulverized soil 50 under the plant into which its roots can readily grow. By enabling the plant to quickly gain an initial foothold and firmly embed its roots, the plant is more likely to survive and less likely to be subsequently uprooted.

From the above disclosure of the general principles of the present invention and the preceding detailed description, those skilled in this art will readily comprehend the various modifications to which the present invention is susceptible. Therefore, the scope of the invention should be limited only by the following claims and equivalents thereof.

What is claimed is:

1. A method for forming a planting hole in soil while leaving a substantial portion of pulverized soil in the hole comprising the steps of:

engaging soil with a leading end of an auger-type bit having a central shaft with two discontinuous and generally parallel flights, said generally parallel flights being closely spaced to one another and adjacent said leading end;

rotating a trailing end of said auger-type bit to advance said generally parallel flights into said soil to pulverize said soil within a resulting planting hole; and removing said auger-type bit from said planting hole while maintaining rotation of the auger-type bit, thereby having a substantial portion of the pulverized soil within the plating hole.

2. A method for forming a planting hole in soil while leaving a substantial portion of pulverized soil in the hole as claimed in claim 1 further comprising the steps of:

advancing said auger-type bit into said soil to a desired planting hole depth; and reciprocally moving said auger-type bit within said planting hole to obtain a desired degree of soil pulverization within said planting hole.

3. A method for forming a planting hole in soil while leaving a substantial portion of pulverized soil in the hole as claimed in claim 2 further comprising the step of reversing the direction of rotation of said auger-type bit for removal from said planting hole.

* * * * *

UNITED STATES PATENT AND TRADEMARK OFFICE
CERTIFICATE OF CORRECTION

PATENT NO. : 5,564,353
DATED : October 15, 1996
INVENTOR(S) : Richard R. Wade, Joseph L. Williams, Todd A. Sheets It is certified that error appears in the above-indentified patent and that said Letters Patent is hereby corrected as shown below:

Col. 6, line 43:

"plating hole" should read --planting hole--

Signed and Sealed this

Eighteenth Day of March, 1997

BRUCE LEHMAN

*Attest:*

*Attesting Officer*     Commissioner of Patents and Trademarks